3,288,613
PREPARATION OF ALGAE AS HUMAN FOOD
Luther W. Reynolds, Philadelphia, Pa., assignor to General Electric Company, a corporation of New York
No Drawing. Filed May 23, 1963, Ser. No. 282,580
4 Claims. (Cl. 99—1)

My invention pertains to a process for the production of food from cellulose-encased cells such as those found in algae.

The search for sources of food is as old as man. Yet with all of his efforts, there are large areas of the world where man's fecundity has outspaced the earth's fertility. In these areas, hunger and malnutrition are common for all but the wealthy. If this situation is to be changed, additional sources of the needed food elements must be provided at a cost within the reach of those who need them.

For other reasons a need is developing for a simple, easily maintained food source. In the cramped quarters of astrospace ships and submarines operating for months in isolation from sources of supplies, efficient use of space requires that the necessary food occupy a minimum volume. Here a means of producing the food as it is needed would be of great value.

It is well known that algae and other simple plants contain within their cells the proteins needed for life. Such plants are readily grown and require little attention. Because of their value as a possible food source, algae in particular have been intensively studied in recent years as witnessed by the numerous publications which can be found in scientific literature.

Unfortunately, the nutrients in these plants in their natural state are contained within cellulose-encased cells. Because humans do not have a digestive enzyme that will convert cellulose to a usable form, the algae cells with their nutritious contents pass through the human digestive tract unchanged unless the cell wall is first removed or broken open. A variety of techniques has been used for this purpose, including heating, ultra-sonics, and mechanical crushing. Each method has its advantages and disadvantages. None is entirely satisfactory.

Accordingly, it is an object of this invention to make the nutrients contained within the cells of algae and other simple plants available for human food.

In carrying out a preferred form of my invention, hydrogen peroxide is added to an aqueous suspension of algae. After reacting for about fifteen minutes, it can be consumed directly as algae soup, or the treated algae concentrated by evaporating some of the water, or the protein separated by mechanical means such as centrifuging.

In performing the process, to aqueous suspension of algae substantially 1% by volume there is added 1% of a 30% hydrogen peroxide solution. The addition of the hydrogen peroxide is done starting at room temperature; however, an exothermic reaction occurs. Heat is generated for ten to fifteen minutes. It is postulated that the peroxide oxidizes some of the bonds in the cellulose molecules reducing them to digestible carbohydrates, but this has not been demonstrated. The remaining hydrogen peroxide gradually decomposes to oxygen and water if the mixture is not used immediately, but may be ingested without harm. The initial temperatures and concentration of the algea and the hydrogen peroxide can be varied, but if the temperature or concnetration is too high, the protein will be damaged. A starting temperature between 50° and 100° F. is preferred, with the peroxide limited to a volume equivalent to that of the algae.

In one experiment, I added 3 ml. of 30% hydrogen peroxide solution to 100 ml. of a 1% aqueous suspension of the alga Chlorella. (This particular alga has been studied extensively as a possible food source and is well known to those skilled in the art.) After the mixture has reacted fifteen minutes, during which time heat was evolved, the solution began cooling showing the reaction was completed. I then added 10 ml. of a 10% solution of trichloracetic acid to precipitate protein. This is not a preferred way of removing the protein, but was used because it is a test well known to biochemists for showing the presence of protein.

While a particular embodiment of a method of making algae and other cellulose-encased food sources suitable for human food has been described, it will be obvious that changes and modifications can be made without departing from the spirit of the invention and the scope of the appended claims.

What is claimed as new and desired to be secured by Letters Patent of the United States is:

1. The process of producing a digestible human food from algae comprising the addition of a 1% suspension of Chlorella a sufficient amount of 30% hydrogen peroxide to make a final solution of substantially 1% peroxide by weight, both solutions being, when mixed, at about 50° to 100° F., and allowing the mixture to react for about fifteen minutes.

2. The process of claim 1 with the solution concentrated by evaporation of the water.

3. The process claimed in claim 1 with the solids extracted for food purposes by centrifuging the reacted solution.

4. The process of producing a digestible human food from algae comprising the addition to a suspension of Chlorella a 30% solution of hydrogen peroxide in such an amount that the volume equivalent of hydrogen peroxide added substantially equals the volume equivalent of algae in said suspension, said suspension and solution at the time they are mixed having temperatures in the range of from 50° to 100° F. and allowing the mixture to react until the exothermic reaction terminates.

References Cited by the Examiner
UNITED STATES PATENTS
2,928,821   3/1960   Chayen _____ 260—112
FOREIGN PATENTS
363,353   12/1931   Great Britain.
OTHER REFERENCES
Popular Mechanics, June 1960, pp. 123–127, 236–240 and 242.

A. LOUIS MONACELL, *Primary Examiner.*
HYMAN LORD, *Assistant Examiner.*